United States Patent [19]

Attwell

[11] 4,205,919
[45] Jun. 3, 1980

[54] MIXER FOR AND METHOD FOR MIXING PARTICULATE CONSTITUENTS

[75] Inventor: Ronald L. Attwell, Dorchester on Thames, England

[73] Assignee: London Brick Buildings Limited, Warwickshire, England

[21] Appl. No.: 715,300

[22] Filed: Aug. 18, 1976

[30] Foreign Application Priority Data

Aug. 20, 1975 [GB] United Kingdom ............... 34567/75

[51] Int. Cl.² ........................... B28C 5/40; B28C 7/04
[52] U.S. Cl. ........................................ 366/34; 366/37; 366/40; 366/64; 366/193; 366/320
[58] Field of Search .................... 366/6, 27, 30, 33, 34, 366/64, 192, 319, 320, 37

[56] References Cited

U.S. PATENT DOCUMENTS

| 1,714,830 | 5/1929 | Wadsworth | 366/320 |
|---|---|---|---|
| 2,320,469 | 6/1943 | Rasmussen | 366/320 X |
| 2,509,543 | 5/1950 | Truax | 366/319 X |
| 2,746,730 | 5/1956 | Swenson et al. | 366/320 X |
| 3,138,167 | 6/1964 | Fisher | 366/320 X |
| 3,729,177 | 4/1973 | Keyes et al. | 366/320 X |
| 4,071,226 | 1/1978 | Miller | 366/35 X |

FOREIGN PATENT DOCUMENTS 1407035 7/1973 United Kingdom ...................... 366/35

*Primary Examiner*—Christopher K. Moore
*Attorney, Agent, or Firm*—Gifford, VanOphem, Sheridan & Sprinkle

[57] ABSTRACT

A mixer especially for mixing materials such as cement and sand with water and with a fibrous reinforcing material such as glass fibre. The mixer consists of a tubular casing containing a skeletal rotor constructed from a plurality of rods extending longitudinally of the casing and spaced apart laterally of each other at positions circumferentially spaced apart around the axis of rotation of the rotor and the longitudinal axis of the casing. The rods are supported on end plates and a central shaft or stub shafts extending from the end plates. The rods are enveloped along at least part of the axial length of the rotor by a helical, outwardly-directed flight having widely-spaced convolutions to impart a component of movement to the mix along the inside of the tubular casing to an outlet. The fibrous reinforcing material is either poured through an inlet duct into the mix in the rotor near to the outlet from the casing so that the rotor effects mixing of the reinforcing material into the initial mix, or the initial mix discharged from the outlet is fed with the fibrous reinforcing material into a further mixer where the fibrous reinforcing material is mixed by a folding action into the initial mix.

4 Claims, 14 Drawing Figures

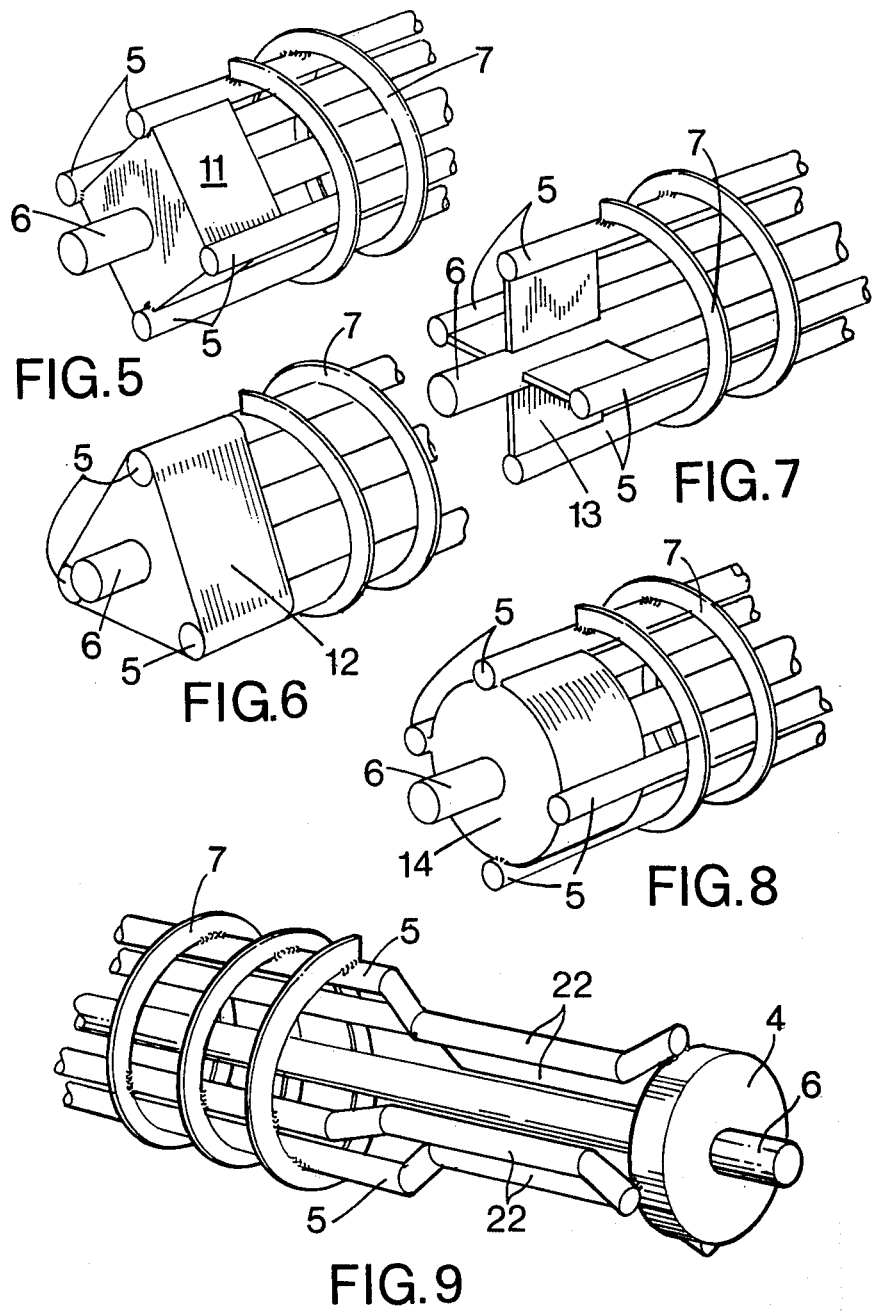

MIXER FOR AND METHOD FOR MIXING PARTICULATE CONSTITUENTS

BACKGROUND OF THE INVENTION

The invention is concerned with apparatus for and a method of producing a continuous stream of a particulate material and where two or more particulate constituents are supplied producing a continuous stream of a mixture of the constituents. The invention is particularly, but not exclusively, concerned with the production of a continuous stream of cement-, gypsum- or plaster-based mix either dry or as a slurry containing liquid (e.g., water). In such mixes, a cement, gypsum or plaster powder is usually reinforced by further particulate constituents such as crushed rock or stone, gravel, sand or manufactured aggregate. It is also known to add a fibrous reinforcing material such as glass fibre, asbestos or plastics or metal filaments to the mix. It is important that the reinforcing materials shall be thoroughly mixed with the powder base and, where a slurry is to be produced, with the correct quantity of water to obtain proper hydration of the cement or other powdered base material.

The quantity of water used in relation to the quantity of cement has a major influence on the workability of the cement mortar or concrete produced and on its final strength. In conventional cement-mixing processes water/cement ratios by weight of between 35 and 100% are commonly employed, whereas a ratio by weight of 28% water/cement is sufficient to obtain hydration; but in practice this is unlikely to be obtained.

In conventional cement-mixing processes, the cement and various reinforcing materials, such as sand and aggregate, are measured by volume or weight and mixed together in batches. In a continuous process plant such as that employed in our co-pending U.S. patent application No. 609,498 it is desirable to use a continuous mixing process providing a continuous stream of mixture. This is particularly important where fibrous reinforcing material, such as glass fibre, is to be incorporated in the mix, as the fibres should undergo a minimum amount of disturbance to avoid damage to or degradation of the fibre and the consequent risk of corrosion by the cement and loss of strength in the final material.

SUMMARY OF THE INVENTION

According to the invention, particulate material is introduced into a tubular casing containing a skeletal rotor which is rotated relatively to the casing and thereby effects tumbling of the material within the casing and also centrifugal force which effects movement of the material to the peripheral wall of the casing, a component of movement also being imparted to the material to effect its transference along the tubular casing to an outlet spaced longitudinally of the tubular casing from an inlet thereto, from which outlet a continuous stream of material is discharged during the introduction of particulate material into the tubular casing.

Where two or more particulate materials are introduced into the tubular casing, the materials are mixed together during their passage through the rotor and a continuous stream of the mixture is discharged from the outlet.

Water or other liquid may be introduced into the tubular casing, the quantity of water in the case of a cementitious mix being just sufficient to produce a slurry containing the correct amount of water to effect hydration of cement, gypsum or plaster introduced as one of the constituents.

Where a fibrous reinforcing material is to be included in the mixture, the fibrous reinforcing material may be one of the initial constituents or it may be introduced into the continuous stream of an initial mixture passing through the rotor or discharged from the outlet of the tubular casing.

The invention also includes apparatus for effecting the method as aforesaid and including said tubular casing and said skeletal rotor, the rotor comprising a plurality of elongate members extending longitudinally of the casing and spaced apart laterally of each other at positions circumferentially spaced apart around the axis of rotation of the rotor and the longitudinal axis of the casing, the rotor being supported by shaft means extending co-axially of the casing and arranged to rotate the rotor relatively to the casing.

The number, cross-sectional shape and dimensions and the spacing of the elongate members may be varied according to the materials to be mixed. For instance, light, friable powders might be best mixed by using as the elongate members six rods of small diameter whereas heavy, cohesive or granular materials might be best mixed by using only two or three rods of larger diameter.

Conveniently the elongate members are enveloped along at least part of the axial length of the rotor by a helical, outwardly-directed flight having widely-spaced convolutions to impart said component of movement along the tubular casing.

The clearance between the outer periphery of the helical flight and the casing, the depth of the helical flight and the angle and pitch of the helix of the helical flight and the speed of rotation of the rotor which may be selected depend upon the type of constituents to be mixed and conveyed and also on the rate of throughput of mixture to be passed through the apparatus.

It is possible to vary all or some of these factors for optimum performance at a chosen rate of throughput for a particular mix of constituents; but in practice a compromise between different factors would be made to provide apparatus which is capable of mixing a variety of materials at different rates of throughput.

Where compression of the continuous stream discharged from the outlet is required, the helical flight may be arranged to be of decreasing pitch in the direction of flow along the rotor.

The shaft means may be a shaft extending co-axially through the rotor between end plates thereof on which the elongate members are carried.

Alternatively, the rotor may include an end plate at each end thereof on which the elongate members are carried, each end plate supporting or being supported by a co-axial stub shaft by which the rotor is supported co-axially in the tubular casing, one of the stub shafts being rotatably driven and arranged to rotate the rotor.

Where water or other liquid is introduced into the housing, the aforesaid coaxial shaft or at least one of the stub shafts may be tubular and be employed to supply the liquid to an outlet therein within the interior of the tubular casing.

A removable tubular sleeve may be provided between the rotor and the casing to form a removable lining in the casing. The sleeve may be replaced when it becomes worn as a result of the abrasive action of the material passing therethrough or if it becomes damaged. The removable sleeve also makes cleaning of the apparatus easier. The removable sleeve would be provided, where necessary, with apertures registrable with inlet and outlet apertures provided in the casing.

Where a fibrous reinfrocing material is to be introduced into the mixture, the introduction may be effected at any desired position along the rotor. For example at or just upstream of the outlet from the tubular casing or downstream of the outlet. For example, the fibrous reinforcing material may be introduced into the casing of the rotor through a further inlet positioned immediately above a portion of the rotor adjacent a discharge outlet from the rotor casing. In this case the said portion of the rotor, together with material passing therethrough to the discharge outlet, may serve to control the introduction of said fibrous reinforcing material into the material passing through said portion of the rotor by effecting a restriction on the free flow of said fibrous reinforcing material through the further inlet. Conveniently, the area of the discharge outlet may be made variable, for example by an adjustable shutter, thereby to control the rate of discharge of material therethrough and hence the instantaneous quantity of material in said portion of the rotor, whereby the restriction effected on the free flow of said fibrous reinforcing material from the further inlet is controllable. The helical flight surrounding the elongate members of the rotor may terminate at the upstream end of said portion of the rotor or the helical flight may extend through said portion of the rotor.

Alternatively, the outlet may be connected to a further tubular casing, which may be a downstream extension of the first tubular casing, containing an eccentrically-mounted rotor, rotation of the latter within said further tubular casing effecting successive compression and relaxation of the continuous stream of mixture discharged through said outlet, means being provided to introduce said fibrous reinforcing material into said further tubular casing, whereby on rotation of the eccentric rotor, the fibrous reinforcing material will be mixed in the continuous stream of mixture passing through said further tubular extension during the successive squeezing and relaxation of said continuous stream of mixture.

The mixture stream may be moved along said further tubular casing under gravity by sloping said further tubular casing downwardly to an outlet therefrom or by effecting a forced flow by providing a helical, outwardly-directed flight around the eccentric rotor and/or by making either or both the eccentric rotor and said further tubular casing of frusto-conical shape so that the flow path defined between said further tubular casing and the eccentric rotor is of increasing area towards the outlet from said further tubular casing.

BRIEF DESCRIPTION OF THE DRAWINGS

By way of example, several forms of apparatus for mixing two or more particulate constituents particularly of cement-, gypsum- or plaster-based mix are now described with reference to the accompanying drawings, in which:

FIGS. 5 to 9 are perspective sketches of alternative end portions of the rotor shown in FIG. 1;

DESCRIPTION OF THE PREFERRED EMBODIMENT

Figure 1:
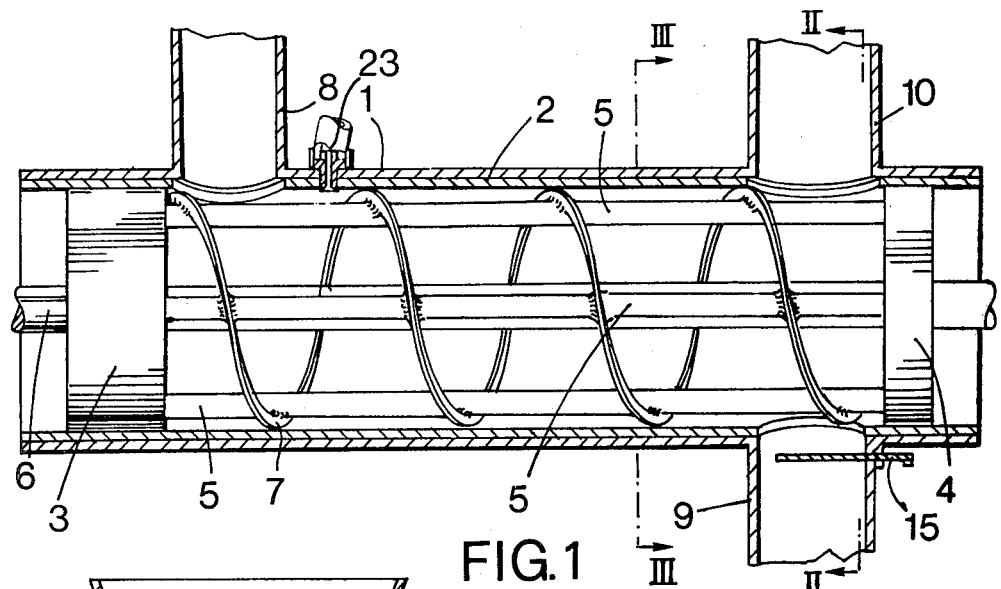
FIG. 1 is an axial section through a first embodiment but showing a rotor thereof in elevation.
Figure 2:
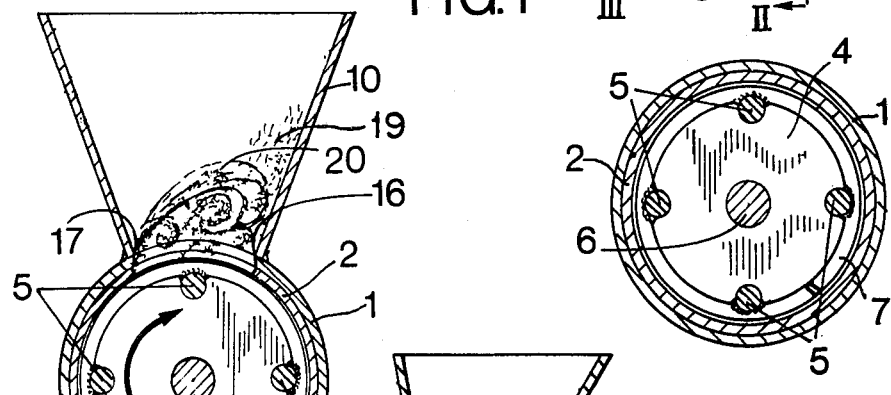
FIG. 2 is a section on the line II—II in FIG. 1 showing a hopper for the introduction of fibrous reinforcing material to a mix in the rotor.
Figure 3:
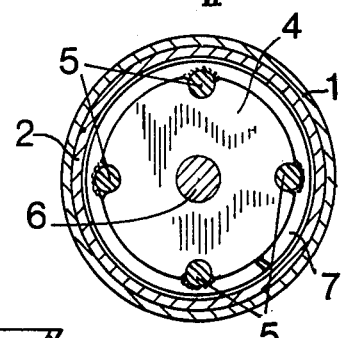
FIG. 3 is a section on the line III—III in FIG. 1.

Referring to FIGS. 1–3, the first embodiment of the apparatus provided by this invention is intended to mix a cement slurry and to reinforce that slurry by the introduction of glass fibres thereto. The apparatus comprises a tubular casing 1 fitted with a tubular lining sleeve 2, which may be removable from the casing 1. The sleeve 2 contains a rotor formed from disc-like end plates 3 and 4 between which a plurality of rods 5 extend longitudinally of the sleeve and the casing. The rods 5 are spaced apart around the axis of rotation of the rotor, that is around the longitudinal axis of the casing 1 and the sleeve 2, and may extend parallel to the longitudinal axis of the casing, as shown, or be inclined thereto to provide a rotor in which the ends of the rods 5 at one end plate are displaced circumferentially with respect to the ends of the rods at the other end plate. The rotor has a central shaft 6 which extends co-axially through and is secured to each end plate 3, 4. Alternatively each end plate 3, 4 may have a stub-shaft extending axially therefrom or be provided with a central socket in which a stub-shaft is located. The rotor is arranged to be rotated by the shaft 6 or by one of the stub-shafts, where provided. The shaft 6 or the stub-shafts are supported in bearings (not shown). Additionally, the rotor may be strengthened between the end plates by spokes (not shown) or equivalent bracing members. The rotor also carries a helical flight 7 having widely-spaced convolutions. This is securely fixed to the rods by, for example, welding or brazing and so the rotor forms a rigid skeletal structure. The depth of the helical flight 7 is such that there is a running clearance between the outer periphery of the helical flight 7 and the inner circumferential surface of the sleeve 2. The casing 1 has an inlet 8 in its peripheral wall adjacent the upstream end of the rotor and an outlet 9 in its peripheral wall adjacent the downstream end of the rotor and at a position diametrically opposed to the inlet 8. The sleeve 2 has apertures therein in registration with the inlet 8 and outlet 9. The constituent materials to be mixed are introduced through the same or separate hoppers to the inlet 8. Alternatively a plurality of inlets 8 arranged longitudinally or circumferentially of the casing may be provided for the separate constituent materials.

In operation, the rotor is rotated and dry constituents (e.g. cement and sand) are introduced through the inlet 8. The elongate members, that is the rods 5, effect tumbling of the constituents in the casing and throw them by centrifugal force against the lining sleeve 2 or, where the latter is not provided, against the inside of the peripheral wall of the casing 1. This action has the result of thoroughly mixing the constituents. The helical flight 7 serves to impart a motion along the length of the casing 1 to the mix and thus a continuous stream of the mix is discharged through the outlet aperture 9. So far in this description, a further inlet hopper 10 has been ignored. The purpose of the inlet hopper 10 will be described hereinafter. Although at least two constituents to be mixed are usually introduced through the inlet 8, the apparatus could still be used when only one constituent is introduced through the inlet 8. In that case the apparatus would act as a conveyor. However the tumbling action produced by the rods 5 would keep the material in continuous movement and would aid its movement along the casing and would reduce any tendency for the material to coalesce.

Usually, but not always, the constituent material or materials will need to be mixed with water or other liquid. This may be conveniently introduced immediately after the dry constituents have entered the casing 1 through the inlet or inlets 8. A water inlet is shown at 23. Alternatively, the shaft 6 or stub-shaft adjacent the end-plate 3 may be tubular and be used to admit water into the casing through a nozzle or aperture in the shaft.

Where water is introduced into a cement/sand mixture or the like, the resulting slurry would have an abrasive action on the lining sleeve 2. When worn, the sleeve 2 can readily be removed and replaced. Thus the casing 1 is protected from excessive wear. The use of the removable lining sleeve 2 also enables the apparatus to be more readily cleaned or unclogged after operation and therefore reduces the time when the apparatus is unavailable for production.

The number, cross-sectional shape and dimensions and the spacing of the rods 5 may be varied according to the materials to be mixed. For instance, light friable powders might be best mixed by using say six rods of small diameter whereas heavy, cohesive or granular materials might be best mixed by using only two or three rods of larger diameter. FIGS. 5 to 8 show, somewhat diagrammatically, end portions of alternative rotors having different arrangements of rods 5 and mounting means 11, 12, 13, 14 therefor.

The clearance between the outer periphery of the helical flight 7 and the lining sleeve 2, the depth of the helical flight 7 and the angle and pitch of the helical flight and the rotational speed of the rotor which may be selected depend upon the type of constituents to be mixed and conveyed and also by the rate of throughput of the mixture to be passed by the apparatus. For example in the case of a glass fibre reinforced cement of 2 parts cement, 1 part fine sand, 5% of glass fibre by weight and having a water/cement ratio by weight of 0.30, a clearance between the outer periphery of the helical flight 7 and the lining sleeve 2 of 6 mm. will give optimum performance for a casing having an inside diameter, or inside sleeve diameter of about 125 mm.

With regard to rotational speed, for a glass fibre reinforced cement mix having a range of between 100% cement/0% sand or other filler to 30% cement/70% sand or other filler and a water/cement ratio by weight in the range 0.70 to 0.28 and added reinforcing fibre of up to 8% of total mix and a throughput of between 10 and 100 Kgm/minute, the rotational speed would be between 40 and 1500 r.p.m.

It is possible to vary all or some of the foregoing factors to give optimum performance at a chosen rate of throughput for a particular mix of constituents; but in practice a compromise between different factors would be effected to enable the apparatus to be capable of mixing a variety of materials at different rates of throughput.

Due to the intimate nature of the mixing effected by the apparatus, less water needs to be used than with conventional cement mixing apparatus. For example good mixing has been effected with the present apparatus when using only about 25% by weight of water.

The helical flight 7 is shown with a uniform pitch but where some compaction of the mix is required at the outlet, the helical flight may have a pitch which gradually reduces towards the outlet 9.

Although the casing 1 has been shown horizontal in FIG. 1, it may be inclined or even be upright. The pitch and helix angle of the helical flight would be selected to give the required movement of the mix along the casing. Where the casing slopes downwardly sufficiently for there to be flow under gravity along the casing, the helical flight would not be required.

Figure 4:
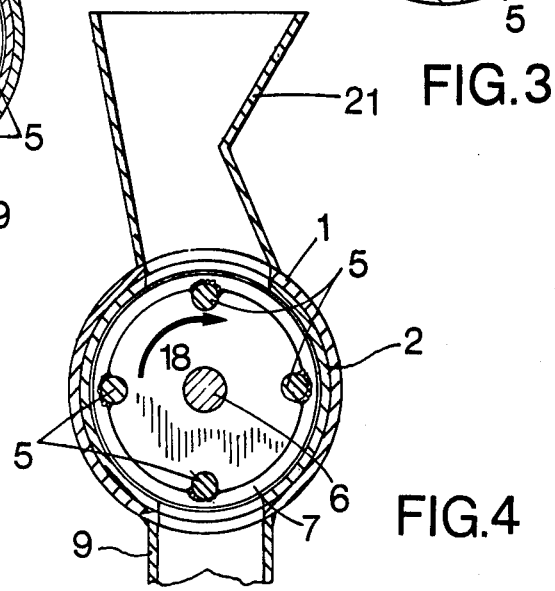
FIG. 4 is a section similar to FIG. 2 but showing an alternative hopper for the introduction of the fibrous reinforcing material.

It is particularly intended that the apparatus should be used for introducing a chopped, fibrous reinforcing material, such as glass fibre, into a cement, gypsum or plaster-based mix. The fibrous material may be introduced into the mix any where along the casing or downstream of the outlet 9, but a convenient place for the introduction of the fibrous, reinforcing material is at the end portion of the rotor adjacent the outlet 9. For this purpose, the apparatus shown in FIGS. 1 to 3 includes a further inlet duct 10. The duct 10 is positioned diametrically opposite the outlet 9 above the adjacent end portion of the rotor. The fibrous, reinforcing material is blown or poured into the duct 10 but it does not fall straight through the skeletal rotor as the mixed material which has been conveyed along the rotor to the end portion adjacent the outlet 9 acts to hold-back the reinforcing material. As the mix is moved around by the rotor, the reinforcing material will be folded into the mix first before it is discharged through the outlet 9. As shown in FIG. 1, the outlet 9 may have an adjustable shutter 15 by which the flow area through the outlet 9 can be varied. By suitable adjustment of the shutter 15 a back-up of mix can be effected in the rotor and so the mix will tend to move into the lower end of the duct 10, whereby the folding in of the fibrous reinforcing material will occur at the outlet of the duct 10. By adjustment of the shutter 15, the flow of fibrous reinforcing material from the hopper can be made to move from leading edge 16 of the duct 10 to the trailing edge 17 indicated in FIG. 2, the direction of rotation of the rotor being in the direction of arrow 18 in FIG. 2. The rotation of the rotor may be in the reverse direction but in that case a helical flight 7 of opposite hand to that shown in FIG. 1 would be required. In FIG. 2, the reinforcing material is indicated at 19 and the penetration into the duct 10 and folding in of the mix is indicated at 20. Walls defining the outlet duct may be inclined in the direction of rotation 18 of the rotor where the reinforcing material is blown into the duct to prevent or restrict entry of the mix into the duct 10 as indicated for duct 21 in FIG. 4. The leading or trailing walls of the duct or both may be adjustable in inclination. Although in FIG. 1, the helical flight 7 extends to the outlet end of the rotor, it may terminate before it reaches the duct 10 and furthermore the overall diameter of the rotor may be reduced beneath the duct 10, by bending end portions 22 of the rods 5 inwardly as indicated in FIG. 9. Variations in the shape of the duct 10 and the outlet end portion of the rotor may be made to give optimum results when introducing other reinforcing materials, for example, wire strands or paper pulp. In addition to fibrous reinforcing materials, aggregates, dusts, sands, powders or granular materials may be added through the duct 10.

Figure 10:
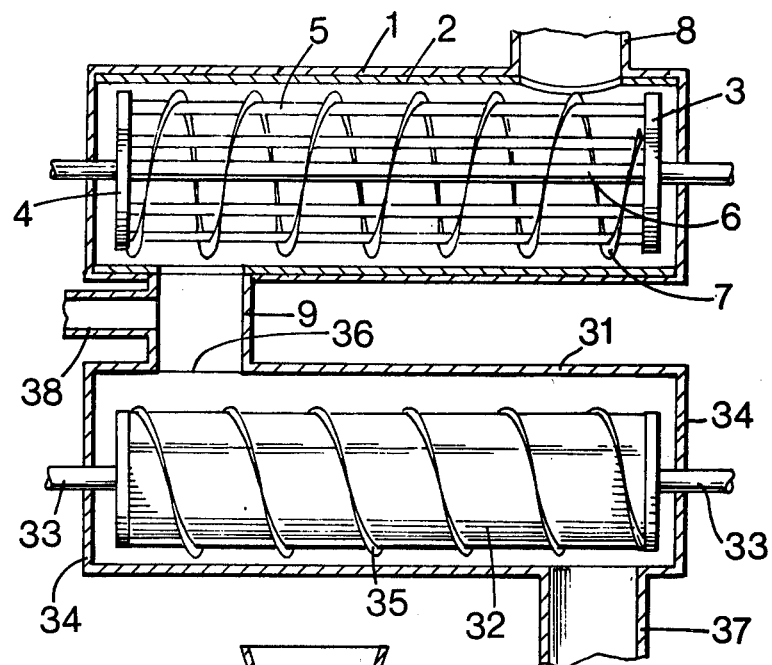
FIG. 10 is an axial section of a second embodiment but showing a pair of rotors thereof in elevation.
Figure 11:
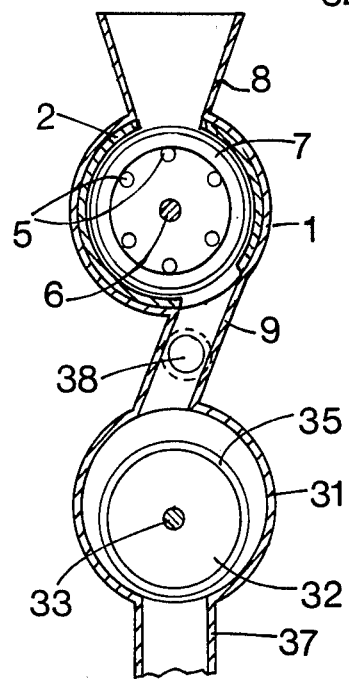
FIG. 11 is a section on the line XI—XI in FIG. 10.

Instead of introducing the reinforcing material through the duct 10 provided in the apparatus shown in FIGS. 1–3, it may be introduced into the mix or slurry downstream of the outlet 9 in a further mixer, now described with reference to FIGS. 10 and 11. In FIG. 10 a first mixer similar to that shown in FIG. 1 is shown and the same reference numbers have been used for like parts. The outlet 9 carrying the mix or slurry from the first mixer leads into the further mixer which comprises a tubular casing 31, conveniently of the same length as the tubular casing 1, thereby to enable it to be placed alongside the tubular casing 1 to form a combined mixer unit of the length of the tubular casing 1 as illustrated in FIG. 10. The tubular casing 31 contains a drum-shaped rotor 32 mounted for rotation on stub-shafts 33, or a shaft extending right through the rotor 32, supported in end plates or walls 34 of the tubular casing 31. The rotor 32 is mounted eccentrically on the shaft 33 with respect to the tubular casing 31 and the shaft 33, or one of them, where stub shafts are employed, is arranged to be rotated, thereby to produce eccentric rotation of the rotor 32 within the tubular casing 31. The rotor 32 has a helical, outwardly-directed flight 35 enveloping its cylindrical surface. The tubular casing 31 has an inlet 36 communicating with the outlet 9 of the tubular casing 1 so that the continuous stream of mix or slurry from the tubular casing 1 will enter the tubular casing 31 and there be successively compressed and relaxed as the eccentric rotor 32 is rotated. The helical flight 35 imparts longitudinal movement to an outlet 37 at the right-hand end of the tubular casing 31, as shown in FIG. 10. The chopped fibrous material, e.g., glass fibre, is introduced into the mix or slurry, for example by a blower, through an inlet pipe 38 as the continuous stream passes to the tubular casing 31. As the mix or slurry moves along the tubular casing 31 to the outlet 37 and is successively compressed and relaxed by the rotor 32, the fibrous material is mixed gently by a folding action in the mix or slurry. In this way the surface of the fibres is less likely to be damaged and therefore the risk of corrosion of the fibres by the cement is reduced. Although, not illustrated, the shafts 6, 33 of the two rotors may be geared together for rotation by the same motor or other prime mover.

The eccentricity of the rotor 32 in the tubular casing 31 may be adjustable, for example, by raising or lowering the rotor axis relatively to the longitudinal axis of the tubular casing 31.

Alternative methods for moving the mix or slurry along the tubular casing 31, instead of, or additionally to, providing the helical flight 35, are tilting the tubular casing 31 downwardly to the right, referring to FIG. 10, thereby to make use of gravity flow along the casing 31 or to make the rotor 32 or the tubular casing 31, or both, frusto-conical so that the space between the tubular casing 31 and the rotor 32 is divergent from the end thereof adjacent the inlet 36.

Figure 12:
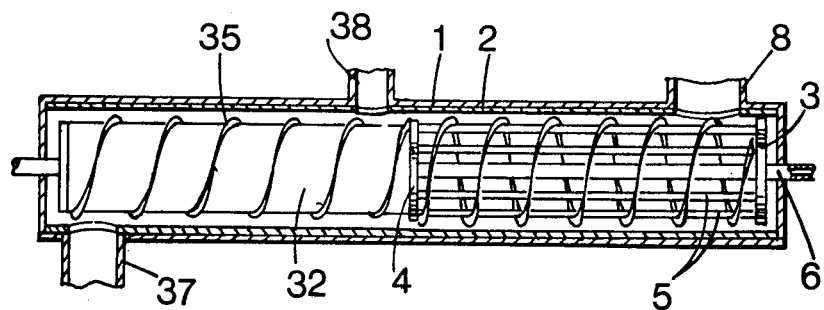
FIG. 12 is an axial section of a third embodiment showing a rotor thereof in elevation.

Although the tubular casings 1 and 31 are illustrated side-by-side, the tubular casing 31 may be arranged in any other position. For example, it may be in axial alignment with the tubular casing 1 or an axial extension thereof, as shown in FIG. 12. In FIG. 12 parts also appearing in FIGS. 1 and 10 have been shown with like reference numbers.

An inlet 38 through which the reinforcing material is blown is provided adjacent the upstream end of the rotor 32.

In the apparatus shown in FIGS. 10 and 12, an adjustable shutter, like shutter 15 in FIG. 1, may be employed to control the flow of mix or slurry through the outlet 37 or at the inlet 36 to the casing of the rotor 32 in FIG. 10.

Instead of providing the tubular housing 31 and rotor 32, to receive the mix or slurry discharged from the outlet 9 of the tubular casing 1, a conventional mixer such as an auger in a tubular casing or a mixer of the pan-and-paddle type, into which the fibrous reinforcing material is introduced may be employed provided the fibrous material will not be degraded by mixing in this way. This method would usually be used for the introduction of aggregate rather than fibrous material.

Figures 13, 14:
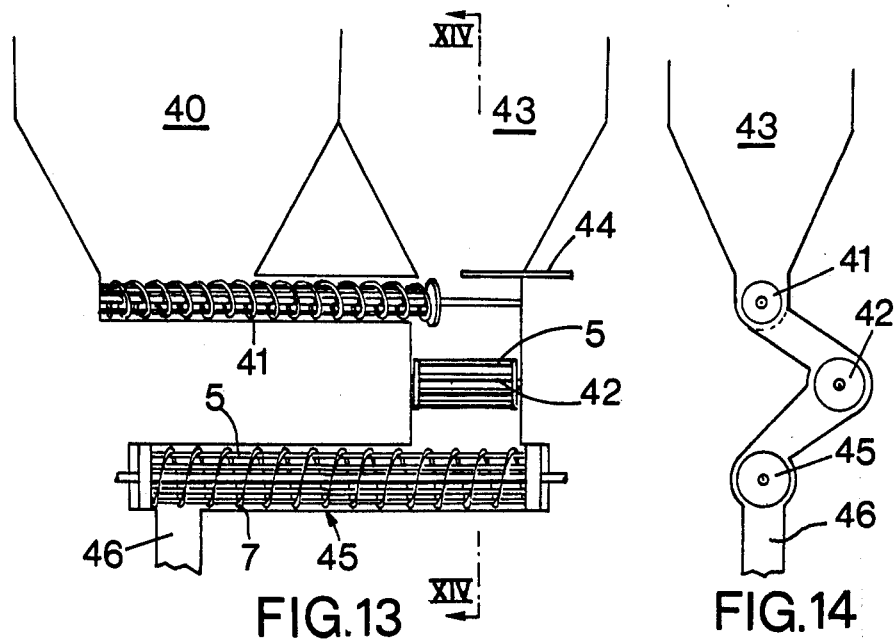
FIG. 13 is a sketch showing feed hopper arrangements for constituents to be mixed for use with apparatus as shown in FIGS. 1, 10 and 12.
FIG. 14 is a section on the line XIV—XIV in FIG. 13.

FIGS. 13 and 14 show a feed arrangement for supplying two constituents, i.e., cement and sand or other filler, separately to the inlet 8 of the tubular casing 1 of the mixer shown in FIGS. 1 to 3. The cement is poured into a hopper 40 and is conveyed by a rotor (like the rotor within the tubular casing 1) employed as a metering conveyor to a pre-mixer 42 comprising a rotor, similar to the rotor within the tubular casing 1, except that as the cement is fed transversely to the elongate members 5 thereof, no helical flight 7 is provided. The sand or other filler is poured into a second hopper 43 also arranged to discharge into the pre-mixer 42 under the control of a valve, such as a gate valve 44. The cement and sand are mixed in the pre-mixer 42 and are discharged into a mixer unit 45, like the mixer comprising the tubular casing 1 and the rotor formed by the rods 5 and helical flight 7 in FIG. 1. The mixer unit 45 may have an inlet duct 10 (as in FIG. 1) for adding reinforcing material, or the output, through an outlet 46, from the mixer unit 45 may be fed to an additional mixer, like the mixer comprising the tubular casing 31 and rotor 32, as in FIG. 10 or 12. The pre-mixer 42 is conveniently offset from beneath the hopper 43 as shown in FIG. 14.

The apparatus comprising the mixers shown particularly in FIGS. 1, 10 and 12 is particularly intended to deliver a continuous stream of slurry to the extruding and moulding machine as described in the aforesaid co-pending Application; but may be used in other applications where a continuous stream of dry mix or slurry with or without fibrous reinforcing material is required to be produced.

What I claim as my invention and desire to secure by Letters Patent of the United States is:

1. Apparatus for producing a continuous stream of material from at least one constituent particulate material, the apparatus including a fixed tubular casing and a skeletal rotor mounted for rotation coaxially within said casing, the skeletal rotor comprising a plurality of elongate members extending longitudinally of said casing and spaced apart laterally of each other at positions circumferentially spaced apart around the axis of rotation of the rotor and the longitudinal axis of said casing, end members to which the elongate members are rigidly attached and by which the elongate members are supported, at least one shaft rigidly attached to and supporting said end members and extending coaxially of and rotatable relatively to said casing and a helical flight extending around the rotor along at least part of its axial length and extending radially outwardly of the rotor, said helical flight rigidly attached at spaced intervals along its length to said elongate members, said elongate members, said end members, said shaft and said helical flight thereby being a rigid unit, the apparatus also including an inlet and an outlet communicating with the interior of said casing and spaced apart longitudinally thereof, the skeletal rotor, when rotated by said shaft effecting tumbling of the material within said casing and also centrifugal outward movement of the material to the inside of the peripheral wall of said casing away from the region of the axis of the rotor and movement by said helical flight of the material adjacent said casing in the axial direction of said casing from said inlet to said outlet, from which a continuous stream of material is discharged during the introduction of particulate material into said casing.

2. Apparatus as claimed in claim 1 in which a removable tubular sleeve is provided between the rotor and said casing to form a removable lining in said casing.

3. Apparatus as claimed in claim 1 in which said casing and the rotor are arranged with their axes substantially horizontal and there is a further inlet positioned immediately above a portion of the rotor adjacent said outlet, said portion of the rotor, together with material passing therethrough to said outlet, controlling the introduction of fibrous reinforcing material through said further inlet into the material passing through said portion of the rotor by effecting a restriction to the free flow of said fibrous reinforcing material from said further inlet to said rotor.

4. Apparatus as claimed in claim 3 in which an adjustable shutter is provided to control the area of said outlet from said casing and thereby to control the rate of discharge of material therethrough and hence the instantaneous quantity of material in said portion of the rotor, the restriction effected on the free flow of said fibrous reinforcing material from said further inlet thereby being controllable.

* * * * *